Dec. 9, 1969 T. H. PURCELL, JR 3,483,044
VENT SYSTEM FOR DEFERRED ACTION BATTERY
Filed May 24, 1967
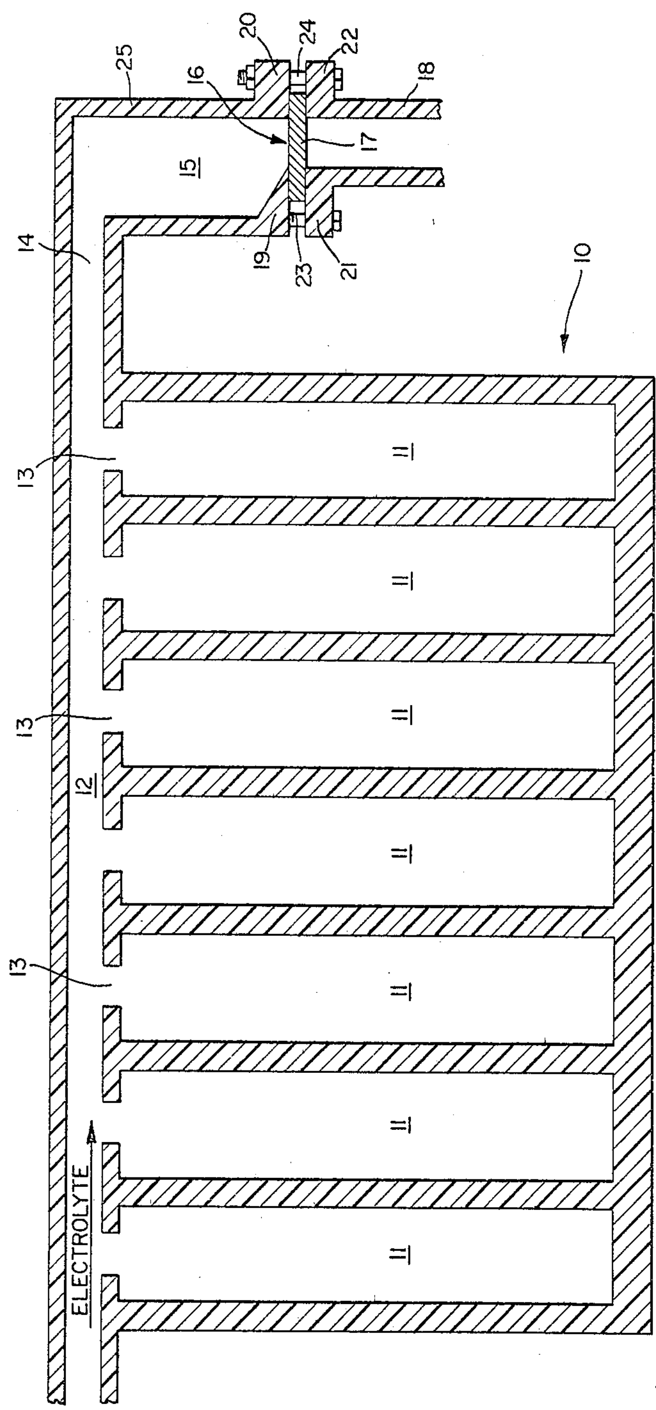
INVENTOR.
Thomas H. Purcell, Jr.

3,483,044
Patented Dec. 9, 1969

3,483,044

VENT SYSTEM FOR DEFERRED ACTION BATTERY

Thomas H. Purcell, Jr., Raleigh, N.C., assignor, by mesne assignments, to ESB Incorporated, Philadelphia, Pa., a corporation of Delaware Filed May 24, 1967, Ser. No. 640,982
Int. Cl. H01m *1/06*
U.S. Cl. 136—177 3 Claims

ABSTRACT OF THE DISCLOSURE

A delay action battery vent system comprising a vent chamber attached to a manifold used to feed electrolyte to a plurality of battery cells whereby a portion of the electrolyte will pass into the vent chamber. A vent opening is located in the bottom of the vent chamber and is covered by a metal diaphragm which reacts rapidly with and is corroded by the battery electrolyte. In this manner, pressure is maintained within the battery during activation, but the metal diaphragm is corroded and burst a predetermined time after the battery is activated, permitting gas and electrolyte to be vented through the vent opening.

BACKGROUND OF THE INVENTION

In a deferred action battery, the electrolyte must be contained within the battery system and maintained under substantial pressure for the first few minutes after activation is initiated. The internal pressure within the system must be maintained in order to force electrolyte into all cells of the battery which is required for proper and rapid activation of the battery.

After the battery has been activated, the reaction of the electrode active materials with the elecrolyte evolves gas which causes a substantial increase in the internal battery pressure. During operation of the battery, there is also a significant temperature increase which reduces the ability of the battery case material to withstand pressure, and in order to prevent explosive rupture of the battery case, it is essential that the battery be vented to relieve the internal pressure, but the operation of the vent must be delayed for proper and rapid activation of the battery.

One method for solving the venting problem is to use an explosive valve to open a pressure relief line connected to the battery. The valve could be opened at a predetermined time by a small explosive device, but this method requires a substantial amount of additional hardware which may be precluded by restricted space or other design requirements.

In general, deferred action batteries having a vent system in accordance with this invention employ alkaline electrolyte in combination with silver and zinc active materials. A method has been devised for using the electrolyte to activate a delay action battery vent system.

SUMMARY OF THE INVENTION

The general object of this invention is to provide a reliable, delay action battery vent system which is activated by the electrolyte of the battery. Other objects and advantages of the invention may be determined from the following description of the invention.

It has been discovered that a metal diaphragm which will react with and be corroded by the battery electrolyte can be incorporated into the battery vent system in a manner which will provide a reliable, delay action vent. In accordance with this invention, a vent chamber is connected to a manifold used to feed electrolyte to a plurality of cells comprising the battery in such a manner that a portion of the electrolyte will be supplied to the vent chamber. In addition, a vent line is attached to the vent chamber. The metal diaphragm comprises a portion of the wall of the vent chamber, and it is interposed between the vent chamber and the vent line in such a manner that if it were not present, fluids entering the vent chamber would have access to and could be vented through the vent line.

The delay action vent of this invention is activated by the battery electrolyte which is supplied to the cells, under pressure, through the manifold. The pressure is sufficient to cause a portion of the electrolyte to pass into the vent chamber where it contacts and reacts with (corrodes) the metal diaphragm. When the battery electrolyte is an alkaline solution (e.g. KOH), the metal diaphragm may be aluminum or other alkali corrodible metal. If the electrolyte is acid, the diaphragm may be magnesium or other acid corrodible metal. The thickness of the metal diaphragm may be chosen so that it will corrode to failure (under pressure) in the desired delay time after battery activation.

It is essential that the metal diaphragm be contacted by the electrolyte and corrode to failure, at which time the internal battery pressure is relieved. It is generally preferred to place the metal diaphragm in the bottom of the vent chamber in order to insure that it is contacted by the battery electrolyte. Since it is possible that the battery and vent chamber might be dislocated from their normal position, it is particularly preferred to place the metal diaphragm in the lower corner of the vent chamber diametrically opopsite to the electrolyte inlet to the vent chamber. In this manner, the electrolyte supplied to the vent chamber will contact the metal diaphragm in the event the side of the vent chamber opposite the electrolyte inlet is placed in the position normally occupied by the bottom of the vent chamber.

BRIEF DESCRIPTION OF THE DRAWING

FIGURE 1 is a sectional view of a multi-cell battery container having a delay action vent in accordance with this invention.

DETAILED DESCRIPTION

A more detailed description of this invention is available by referring to the drawing which illustrates a multicell battery container 10 having a delay action vent system. The battery container 10, which may be a molded epoxy resin, comprises a plurality of cell chambers 11 which are connected to a manifold 12 by electrolyte inlet ports 13 in such a manner that electrolyte passing through the manifold 12 is supplied to the cell chambers 11. Though not shown in the drawing, the cell chambers contain positive and negative electrodes which are electrically insulated from each other by separators. It is conventional for delay action batteries to employ silver positive electrodes, zinc negative electrodes and cellophane separators, in which case the battery electrolyte is generally a potassium hydroxide solution.

Attached to one end of the manifold 12 is an activator chamber containing electrolyte and an activator device which is generally explosively activated to push the electrolyte under pressure into the manifold 12 and thus into the cell chambers 11. The activator device and chamber are not illustrated for they are of conventional design and are not required to fully understand this invention.

Attached to the other end of the manifold 12 by means of an electrolyte inlet port 14 is a vent chamber 15. At the bottom of the vent chamber 15 there is a vent opening 16 which is closed by a metal diaphragm 17. This metal diaphragm 17 may be made from any metal which will react rapidly with and be corroded by the battery electrolyte, such as aluminum when the electrolyte is potassium hydroxide solution or magnesium if the electrolyte is an acid. A vent line 18 is attached to the vent chamber 15, though separated therefrom by the metal diaphragm 17, opposite the vent opening 16. In this manner, the electrolyte and gas in the vent chamber 15 can escape through the vent opening 16 and vent line 18 when the metal diaphragm 17 is sufficiently corroded by the electrolyte that the internal battery pressure can burst the metal diaphragm. The vent chamber 15 has flanges 19 and 20, and the vent line has flanges 21 and 22. The vent line 18 is attached to the vent chamber 15 by means of bolts 23 and 24 which are positioned in the flanges and which also holds the metal diaphragm in place.

It should be noted that the vent opening 16 is preferably located in the lower corner of the vent chamber 15 diametrically opposite to the electrolyte inlet port 14 in order to insure that the electrolyte will contact the metal diaphragm 17. In his manner, the battery can be dislocated from its normal position so that the side 25 of the vent chamber 15 becomes the bottom of the vent chamber, and the battery electrolyte will still contact the metal diaphragm 17.

The following examples illustrate the effectiveness and the reliability of a delay action battery vent system in accordance with this invention:

Example I

Twenty deferred action battery systems were tested to determine the time elapsed between initiation of activation and venting of the battery. A sheet of aluminum foil having a thickness of 0.0005 inch was used as the metal diaphragm which had a burst pressure (non-corroded) of 125 p.s.i. The battery activation pressure, i.e. the equilibrium pressure within the battery after activation, was 50 p.s.i.

For the 20 vent systems which were tested, the average time between initiation of activation and venting was 4.97 minutes. The shortest time was 3.25 minutes and the longest time was 7.25 minutes.

Example II

Twenty deferred action battery vent systems having the same design as the vent systems in Example I were tested to determine the time elapsed between initiation of activation and venting of the battery using a different activation pressure. Again, a sheet of aluminum foil having a thickness of 0.0005 inch was used as the metal diaphragm which had a burst pressure of 125 p.s.i. In this test, the battery activation pressure was reduced to 25 p.s.i.

For the 20 vent systems which were tested, the average time between initiation of activation and venting was 7.84 minutes. The shortest time was 6.5 minutes and the longest time was 9.75 minutes.

Having completely described this invention, what is claimed is:

1. In a deferred action battery having a plurality of cells containing a positive electrode, a negative electrode, a separator between said positive and negative electrodes, and activated by a battery electrolyte solution which passes through a manifold connected to each cell, the improvement which comprises a delay action battery vent system comprising a vent chamber attached to said manifold by means of an electrolyte entry port whereby a portion of the activating electrolyte can pass into said vent chamber, a vent opening located in the bottom of said vent chamber, a metal diaphragm covering said vent opening and located between the vent opening and a vent line which is attached to said vent chamber and said metal diaphragm being of a metal which reacts rapidly with and is corroded by the battery electrolyte solution.

2. A battery in accordance with claim 1 in which the vent opening is located in the lower corner of the vent chamber diametrically opposite to the electrolyte entry port.

3. A battery in accordance with claim 1 in which the battery electrolyte is an alkaline solution and the metal diaphragm is aluminum.

References Cited

UNITED STATES PATENTS

| | | | |
|---|---|---|---|
| 2,829,187 | 4/1958 | McDonald | 136—112 XR |
| 2,872,499 | 2/1959 | Rowls et al. | 136—181 XR |
| 2,886,621 | 5/1959 | Hinman | 136—162 XR |

WINSTON A. DOUGLAS, Primary Examiner

D. L. WALTON, Assistant Examiner

U.S. Cl. X.R.

136—90, 114, 162